United States Patent
Hermann et al.

(10) Patent No.: US 7,464,919 B2
(45) Date of Patent: Dec. 16, 2008

(54) ELASTIC INSERTION BEARING

(75) Inventors: Waldemar Hermann, Jossgrund (DE); Holger Ries, Grob-Gerau (DE); Ferenc Schmidt, Pomaz (HU)

(73) Assignee: Woco AVS GmbH, Bad Soden-Salmunster (DE)

( * ) Notice: Subject to any disclaimer, the term of this patent is extended or adjusted under 35 U.S.C. 154(b) by 0 days.

(21) Appl. No.: 11/774,207

(22) Filed: Jul. 6, 2007

(65) Prior Publication Data

US 2008/0009178 A1 Jan. 10, 2008

(30) Foreign Application Priority Data

Jul. 6, 2006 (DE) .................. 10 2006 031 348

(51) Int. Cl.
*B60G 13/00* (2006.01)
(52) U.S. Cl. .................. 267/220; 267/141.7; 267/293; 280/124.155
(58) Field of Classification Search ............ 188/321.11; 267/140.2, 141.2–141.7, 220, 293; 280/124.155
See application file for complete search history.

(56) References Cited

U.S. PATENT DOCUMENTS

| | | | | |
|---|---|---|---|---|
| 2,621,923 A | * | 12/1952 | Krotz | .................. 267/281 |
| 3,385,543 A | * | 5/1968 | Werner et al. | ............... 384/582 |
| 3,975,007 A | * | 8/1976 | Chorkey | .................. 267/152 |
| 4,877,262 A | * | 10/1989 | Tanahashi et al. | ..... 280/124.155 |
| 5,865,429 A | * | 2/1999 | Gautheron | ............... 267/141.7 |
| 6,513,801 B1 | * | 2/2003 | McCarthy | .................. 267/293 |
| 6,854,723 B2 | * | 2/2005 | Ogawa et al. | ............... 267/293 |
| 6,908,076 B2 | * | 6/2005 | Hayashi et al. | ............. 267/220 |
| 7,311,181 B2 | * | 12/2007 | Germano et al. | ....... 188/321.11 |

* cited by examiner

*Primary Examiner*—Christopher P Schwartz
(74) *Attorney, Agent, or Firm*—Dannis J. Williamson; Moore & Van Allen, PLLC

(57) ABSTRACT

In an elastic insertion bearing for supporting a component extending substantially axially, such as a damper rod for a strut tower on a vehicle body and for fitting in a vehicle body-side mount, comprising a rigid core to which the component can be secured, and an elastomeric body radially surrounding the core, it is provided for that at least two of the outer shell sections radially surrounding the elastomeric body are provided circumferentially spaced away from each other in the unfitted condition and which on being fitted can move each radially on the other such that the circumferential spacing is reduced in precompression of the elastomeric body.

11 Claims, 2 Drawing Sheets

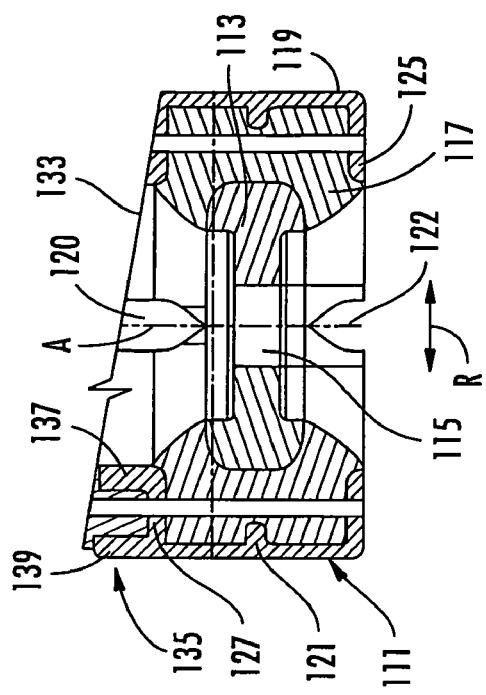
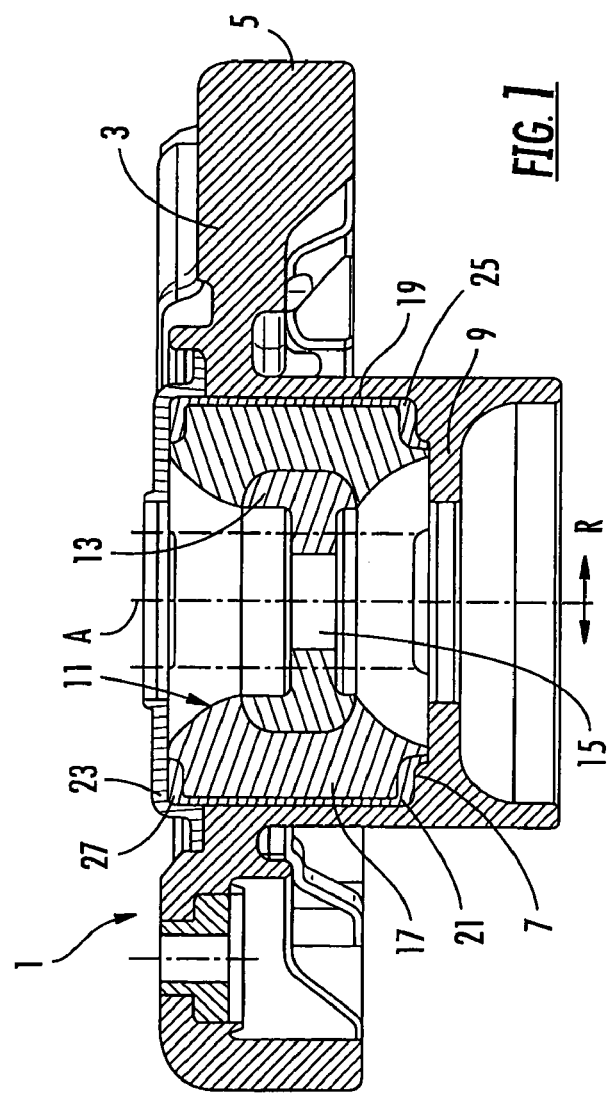

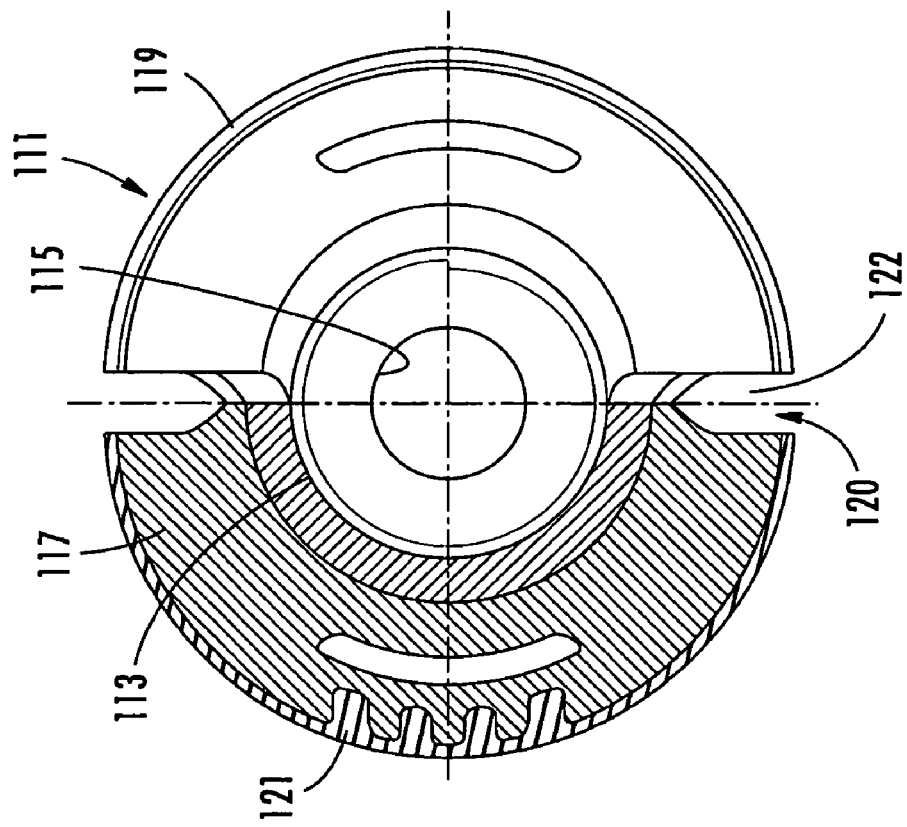
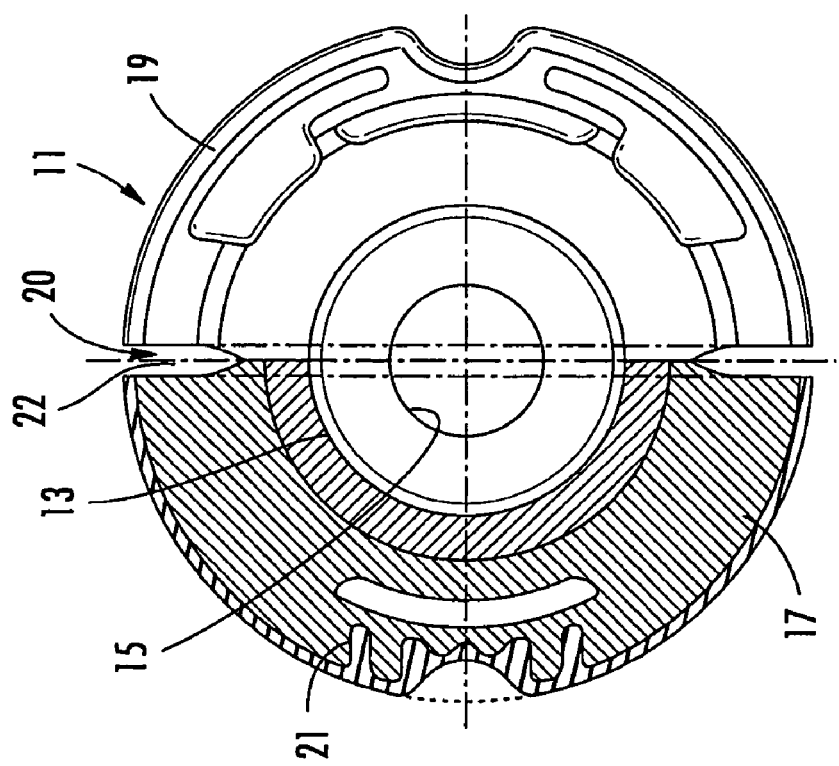

ELASTIC INSERTION BEARING

CROSS-REFERENCE TO RELATED APPLICATION

This application claims priority benefits under 35 U.S.C. § 119(a) to German Patent Application No. DE 10 2006 031 348.8, entitled "Elastic Insertion Bearing," and filed Jul. 6, 2006, the contents of which are incorporated by reference herein in their entirety.

BACKGROUND

The invention relates to an elastic insertion bearing for supporting a component extending substantially axially, such as a damper rod for a strut tower on a vehicle body. The elastic insertion bearing is intended for insertion in a body-side mount formed either on a member fitted to the vehicle body or by a section of the vehicle body itself. The elastic insertion bearing comprises a rigid plate-like core having a bore through to receive the supporting axial component and for securing thereto. The core is surrounded by an elastomeric body.

BACKGROUND OF THE INVENTION

Such insertion bearings are often employed to elastically locate a strut mount of a spring damping system by the strut tower being secured to the core.

A generic elastic insertion bearing is known for example from German patent DE 10 2004 003 132 A1 wherein the elastomeric body surrounding the core is mounted in a recess of a rigid housing structure.

To provide an arrangement of the strut tower inclined radially relative to the vehicle body, a wedge element is interposed in this known insertion bearing between the elastomeric body and a cap closing off the concavity in the housing structure. To preload the elastomeric body the cap is bolted to the vehicle body, diminishing the space defined by the housing structure and cap and compressing the elastomeric body. Compressing the elastomeric body in this way adds to the useful life of the insertion bearing in that a change in the internal stress from compression to tension can be prevented in the elastomeric body also when operated in tensile loading.

BRIEF SUMMARY OF THE INVENTION

One drawback discovered in this known bearing is that, because of the dynamic mounting of the cap bolted to the vehicle body, friction sites materialize in the area of the elastomeric body and cap as well as in the area of the housing structure which can result in a jolt and squeaking noise nuisance under load.

SUMMARY

It is an object of the invention to overcome the drawbacks of the prior art particular in sophisticating one such generic elastic insertion bearing such that in ensuring precompression for high-performance damping the noise nuisance due to friction sites of the elastomeric body is now practically eliminated.

This object is achieved by the features as set forth in claim 1. In accordance therewith at least two outer shell sections radially surrounding the elastomeric body are provided circumferentially spaced away from each other in the unfitted or unmounted condition and which, on being fitted, can be moved radially on each other such that the circumferential spacing is reduced in precompression of the elastomeric body. The outer shell sections may be parts made of a plastics material secured to the elastomeric body.

This aspect in accordance with the invention now makes it possible to reinforce the elastomeric body with outer shell sections of high resistance and low wear, this outer reinforcement, despite securement, particularly in being vulcanized in place, still permitting mechanical precompression in being fitted. In this arrangement the circumferential spacing between the outer shell sections serves as a shaping source in setting the degree of precompression within the elastomeric body. The degree of precompression is, of course, also a function of the inner dimension of the vehicle body-side mount of the elastic insertion bearing which is smaller than the outer circumference of the insertion bearing before being inserted in the mount.

The insertion bearing in accordance with the invention now practically eliminates nuisance noise forming due to friction sites at the elastomeric body. Due to the low wearing outer shell sections which may be made of a rigid plastics material, for example, the durability of the elastic insertion bearing in accordance with the invention is also improved. In addition, the elastic insertion bearing in accordance with the invention is less expensive than known insertion bearings because complicated clamping devices for attaching the cap and preloading can now be eliminated.

In accordance with a further embodiment of the invention the insertion bearing is formed with three, four, five, six, seven or eight outer shell sections each spaced away from each other. This preferred embodiment now makes it possible to tweak the dynamic response of the elastic insertion bearing precisely to the particular application concerned.

Preferably the outer shell sections feature substantially the same radius of curvature, they in particular forming right cylindrical sections of a shell which are identical, forming a circular continuous outer shell when stacked in a fitted extreme condition.

In another further embodiment of the invention the circumferential outer shell sections surround the elastomeric body radially, particularly a shoulder integral with the outer shell sections extending substantially radially inwardly to the rigid core in the region of at least one axial end of the elastomeric body. The shoulder clasps the elastomeric body such that when the elastomeric body is compressed on fitting the insertion bearing, any deviation in the elastomeric body material axially is blocked. Preferably a shell extending radially inwardly is provided in the region of both axial ends of the elastomeric body. In this arrangement the shoulders can define the end of the insertion bearing or protrude into the end portion of the elastomeric body in the latter to clasp a main part of the elastomeric body in the middle together with the outer shell sections.

With the shoulders extending radially inwardly, defining an axial space, already defined by the outer shell section radially outwards and by the core radially inwardly, a secure housing is formed for the elastomeric body which can still be modulated in shape for precompression axially and radially.

Preferably the outer surface area of the at least one shoulder is free of an elastomeric material so that the insertion bearing when fitted is in direct contact with the vehicle body-side mount by the at least one shoulder, particular in contacting the flange section or damper rod.

In another further embodiment of the invention a side of the insertion bearing facing the vehicle body is configured inclined radially. For this purpose an axial ramped structure may adjoin for example each shoulder of the outer shell sections, this structure being formed particularly by two axial ribs configured integrally with the outer shell section in each case and between which elastomeric material is disposed.

For setting a predefined damping response of the elastomeric body, the elastomeric body may feature level with the circumferentially spacing of juxtaposed outer shell sections a radially outwards located material recess opening particular radially outwards into the circumferentially spacing which in the fitted condition is reduced or in the extreme case is totally eliminated.

Preferably the elastomeric body is vulcanized in place to the core and outer shell sections.

The invention relates furthermore to an elastic bearing, particular for mounting a strut tower, including a flange for securing to the vehicle body. The flange comprises a mount into which an insertion bearing as recited above in accordance with the invention can be inserted.

The fitting pressure within the elastomeric body is defined so high that the insertion bearing is held in place in the mount free of additional fasteners, particular free of a cap.

In addition, an outer circumference of the insertion bearing defined by the outer shell sections can be dimensioned so much smaller than a complementary shaped inner circumference of the vehicle body-side mount that when the insertion bearing is fitted the spacing between the outer shell sections is reduced, particular in coming into contact with juxtaposed outer shell sections.

BRIEF DESCRIPTION OF THE VIEW OF THE DRAWINGS

Further advantages, features and aspects will now be detailed by the following description of preferred embodiments with reference to the attached drawings in which:

FIG. 1 is a cross-sectional view of a strut tower bearing with the elastic insertion bearing in accordance with the invention inserted;

FIG. 2 is a cross-sectional and plan view in part of the strut tower bearing in accordance with the invention as shown in FIG. 1;

FIG. 3 is a cross-sectional view of an insertion bearing in accordance with the invention in a variant modified as compared to that as shown in FIGS. 1 and 2; and FIG. 4 is a cross-sectional and plan view in part of the insertion bearing in accordance with the invention as shown in FIG. 3.

DETAILED DESCRIPTION OF THE INVENTION

Referring now to FIGS. 1 and 2 there is illustrated the strut tower bearing in accordance with the invention identified in its entirety by reference numeral 1 and comprising a mount 3 (shown only in FIG. 1) made of metal or a plastics material. The mount 3 features a flange section 5 via which the strut tower bearing can be secured to a vehicle body part (not shown) by means of bolts (likewise not shown).

The mount 3 features substantially in the middle a concavity 7, the bottom portion 9 of which has an aperture for passage of the strut tower (not shown).

Inserted by a press fit in the concavity 7 is an insertion bearing 11 in accordance with the invention. The insertion bearing 11 comprises an inner plate 13 featuring an aperture 15 for securing the strut tower in a middle part and comprising reinforced rims. The inner plate 13 is surrounded radially outwards by an elastomeric body 17 clasping the rims of the inner plate 13 and which is fitted precompressed in the concavity 7.

Two shell sections 19, 21 each separate from the other and out of contact at least before being fitted, surround the elastomeric body 17 radially outwards. The shell sections 19, 21 form substantially semicircular half shells which before being fitted (see FIG. 2) are located with a circumferential spacing 20. This circumferential spacing 20 is realized as a slot by a recess in both the material of the shell, so that the shell sections are free to move towards each other, and in the material of the elastomeric body, the circumferential dimensions of the recesses being identical.

To fit the insertion bearing 11 the shell sections 19, 21 need to be moved radially towards each other so that the outer dimension thereof corresponds to the inner dimension of the cylindrical section of the concavity 7 in allowing the insertion bearing 11 to be inserted in the concavity. When inserted, the circumferential spacing 20 is significantly reduced or even totally eliminated and the elastomeric body 17 is preloaded. The recess 22 in the elastomeric body 17 serves to prevent elastomeric material, when changing shape on being precompressed and on insertion of the insertion bearing in the mount 3, from gaining access between the rims of the circumferential spacing 20.

On the vehicle body side a cap 23 may be provided to close off the insertion bearing 11 at the vehicle body side in protecting it from ambient wet and dirt contamination.

Both shell sections 19, 21 end in shoulders 25, 27 extending radially inwardly which ensure that when the shell sections are married radially in changing the shape of the elastomeric body 17, the elastomeric material of the latter cannot deviate axially (direction A). It is these shoulders 25, 27 that result in the elastomeric body being precompressed not only radially (direction R) but also axially (direction A).

Referring now to FIGS. 3 and 4 there is illustrated a further aspect of the insertion bearing in accordance with the invention, shown here without the mount, however. Like or similar components of the insertion bearing are identified by the same reference numerals elevated by 100 to facilitate reading the description of the FIGs.

The insertion bearing 111 in accordance with the invention differs from the insertion bearing 11 as shown in FIG. 1 mainly in that the side 133 of the insertion bearing 111 facing the vehicle body (not shown) is inclined radially. This inclination is achieved by means of a ramped structure 135 formed by two axial extending ribs 137, 138 configured integral with the shell sections 119, 121 and between which elastomeric material is located.

When the insertion bearing 111 as shown in FIG. 3 is inserted in the concavity 7 of the mount 3, the shell sections 119, 121 are urged radially (direction R) towards each other, reducing the circumferential spacing 120 between the shell sections 119, 121 in precompressing the elastomeric body 117 both radially (direction R) and axial because of the shoulders 125, 127.

It is understood that the features of the invention as disclosed in the above description, in the drawings and as claimed may be essential to achieving the invention in its various aspects both by themselves or in any combination.

LIST OF REFERENCE NUMERALS

| | |
|---|---|
| | strut tower bearing |
| 3 | mount |
| 5 | flange section |
| 7 | concavity |

-continued

| | |
|---|---|
| 9 | bottom portion |
| 11, 111 | insertion bearing |
| 13, 113 | inner plate |
| 15, 115 | aperture |
| 17, 117 | elastomeric body |
| 19, 21, 119, 121 | shell section |
| 20, 120 | circumferential spacing |
| 23 | cap |
| 25, 27, 125, 127 | shoulder |
| 22, 122 | recess |
| 133 | body facing side |
| 135 | ramped structure |
| 137, 139 | ribs |
| A | axial direction |
| R | radial direction |

What is claimed is:

1. An elastic insertion bearing for supporting a component extending substantially axially, particularly a damper rod for a strut tower, on a vehicle body and for fitting in a vehicle body-side mount, comprising:
a rigid core to which the component can be secured;
an elastomeric body radially surrounding the core; and
at least two outer shell sections radially surrounding the elastomeric body are circumferentially spaced away from each other in an unfitted condition and, on being fitted, can be moved radially on each other such that the circumferential spacing is reduced for precompressing the elastomeric body;
the outer shell sections surround the elastomeric body radially and comprise in the region of at least one of the axial ends of the elastomeric body a shoulder extending radially inwards to encompass at least one section of the elastomeric body such that when the elastomeric body is radially compressed, an axial deviation of the elastomeric body is blocked by the shoulder.

2. The insertion bearing as set forth in claim 1, wherein the elastomeric body features, level with the circumferential spacing of juxtaposed outer shell sections, a radially outwards opening material recess.

3. The elastic bearing as set forth in claim 2 wherein a fitting pressure in the elastomeric body is adequate to hold the insertion bearing in place in the mount free of a cap.

4. The elastic bearing as set forth in claim 2, wherein an outer circumference of the insertion bearing defined by the outer shell sections is dimensioned smaller than a complementary shaped inner circumference of the mount such that when the insertion bearing is fitted, the spacing between the outer shell sections is reduced, with juxtaposed outer shell sections coming into contact.

5. The insertion bearing as set forth in claim 1, wherein each of the outer shell sections at both axial end portions of the elastomeric body comprise a shoulder extending radially inwards which encompasses a middle main part of the elastomeric body such that when radially compressed, any axial deviation of the elastomeric body material is blocked by the shoulders.

6. The insertion bearing as set forth in claim 1, wherein an outer surface of the at least one shoulder is free of an elastomeric material so that the insertion bearing can come into direct contact with the vehicle body-side mount or component.

7. The insertion bearing as set forth in claim 1, wherein an end of the insertion bearing facing the vehicle body is configured inclinedly by a radial direction, an axial ramped structure adjoining each shoulder of the outer shell sections, said ramped structure being formed particular by two axial ribs between which elastomeric material is disposed.

8. The insertion bearing as set forth in claim 1, wherein three, four, five, six, seven or eight separate outer shell sections interconnected particular via the elastomeric body are provided, each featuring a spacing between juxtaposed outer shell sections.

9. The insertion bearing as set forth in claim 1, wherein the elastomeric body is vulcanized in place to the core and to the outer shell sections.

10. An elastic bearing including a flange for securing to the vehicle body comprising a mount for an insertion bearing configured in accordance with claim 1.

11. The insertion bearing as set forth in claim 1, wherein the outer shell sections feature substantially the same radius of curvature, in particular having identical right circular sections.

* * * * *